(12) United States Patent
Kubota et al.

(10) Patent No.: US 7,402,631 B2
(45) Date of Patent: Jul. 22, 2008

(54) ACRYLIC RUBBER AND CROSS-LINKABLE ACRYLIC RUBBER COMPOSITION

(75) Inventors: Isao Kubota, Yokohama (JP);
Nobukazu Kaihatsu, Yokohama (JP)

(73) Assignee: Zeon Corporation, Tokyo (JP)

( * ) Notice: Subject to any disclaimer, the term of this patent is extended or adjusted under 35 U.S.C. 154(b) by 158 days.

(21) Appl. No.: 10/590,732

(22) PCT Filed: Feb. 24, 2005

(86) PCT No.: PCT/JP2005/002996

§ 371 (c)(1),
(2), (4) Date: Aug. 25, 2006

(87) PCT Pub. No.: WO2005/082960

PCT Pub. Date: Sep. 9, 2005

(65) Prior Publication Data

US 2007/0173621 A1    Jul. 26, 2007

(30) Foreign Application Priority Data

Feb. 27, 2004    (JP)    ............................. 2004-052911

(51) Int. Cl.
*C08F 8/32*    (2006.01)
(52) U.S. Cl. .................... 525/329.2; 526/309; 526/318; 525/379; 525/381; 525/382
(58) Field of Classification Search .............. 525/329.2, 525/379, 381, 382; 526/309, 318
See application file for complete search history.

(56) References Cited

U.S. PATENT DOCUMENTS

| | | | | | |
|---|---|---|---|---|---|
| 5,200,472 | A | * | 4/1993 | Naraki | 525/381 |
| 5,250,644 | A | * | 10/1993 | Tokunaga et al. | 526/318 |
| 5,574,117 | A | | 11/1996 | Yoshida et al. | |
| 6,914,098 | B2 | * | 7/2005 | Moriyama et al. | 525/301 |
| 7,169,856 | B2 | * | 1/2007 | Kubota et al. | 525/374 |

FOREIGN PATENT DOCUMENTS

| | | | |
|---|---|---|---|
| JP | 6-80735 A | | 3/1994 |
| JP | 2001-146540 | * | 5/2001 |
| JP | 2003-342437 A | | 12/2003 |
| JP | 2004-18567 A | | 1/2004 |

* cited by examiner

*Primary Examiner*—Bernard Lipman
(74) *Attorney, Agent, or Firm*—Birch, Stewart, Kolasch & Birch, LLP

(57) ABSTRACT

An acrylic rubber, comprising an alkoxyalkyl(meth)acrylate monomer unit in an amount of 70.1 to 99.8 wt %, a methacrylonitrile monomer unit in an amount of 0.1 to 9.9 wt % and a butenedionic acid monoester monomer unit in an amount of 0.1 to 20 wt %; and a cross-linkable acrylic rubber composition made by containing the acrylic rubber and a cross-linking agent. According to the invention, it is possible to provide a cross-linkable acrylic rubber composition having excellent scorch stability and an acrylic rubber cross-linked product, which can be obtained by cross-linking the cross-linkable acrylic rubber composition, having excellent heat resistance, cold resistance and fuel oil resistance.

6 Claims, No Drawings

ACRYLIC RUBBER AND CROSS-LINKABLE ACRYLIC RUBBER COMPOSITION

TECHNICAL FIELD

The present invention relates to an acrylic rubber, a cross-linkable acrylic rubber composition formed by containing the acrylic rubber and a cross-linking agent, and a cross-linked product of the same, more particularly relates to a cross-linkable acrylic rubber composition superior in heat resistance, cold resistance and fuel oil resistance, and a cross-linked product of the same, and an acrylic rubber suitable to the cross-linkable acrylic rubber composition.

BACKGROUND ART

Since an acrylic rubber has excellent heat resistance and oil resistance, etc., it is widely used as a material of rubber parts to be used in a state of contacting oil, etc., such as seals, hoses, tubes and belts, etc. in the automobile-related fields, etc. An acrylic rubber is subjected to cross-linking to obtain rubber elasticity so as to be used as these rubber parts. For that purpose, it is copolymerized with a cross-linkable monomer having an active cross-linking point normally in an amount of 1 to 5 wt % or so. Such a cross-6 linkable acrylic rubber is demanded to have small permanent compression set as well as excellent heat resistance and cold resistance and, furthermore, there has been a demand for those also having excellent fuel oil resistance and excellent scorch stability.

Selection of the cross-linkable monomer to be copolymerized with an acrylic rubber as well as a cross-linking agent to be used in combination therewith results in determining a cross-linking reaction speed, so that it affects storage stability, mechanical characteristics, permanent compression set and heat resistance, etc. Generally, as a cross-linkable monomer to serve as such a cross-linking agent, 2-chloroethylvinyl ether, vinylchloro acetate and other chlorine based monomers, allylglycidyl ether and other epoxy based monomers may be used.

As cross-linkable monomers, maleic acid, fumaric acid and other butenedionic acid monoesters, specifically, butenedionic acid monobutyl ester has been also studied. Among them, a cross-linked product of an acrylic rubber composition formed by including an aromatic diamine cross-linking agent and a guanidine compound cross-lining auxiliary in an acrylic rubber obtained by copolymerizing with 0.1 to 10 wt % of monolower alkyl ester of fumaric acid has been reported to exhibit excellent heat resistance and cold resistance (the patent article 1). However, these acrylic rubber compositions were poor particularly in scorch stability.

Also, it has been reported that when using an acrylic rubber composition obtained by copolymerizing alkoxyalkyl acrylate, acrylonitrile in an amount of 10 to 15 wt % and a necessary amount of cross-linkable monomer as an automobile fuel hose, fuel impermeability can be improved while maintaining sour gasoline resistance and amine resistance, etc. (the patent article 2). However, the composition has a disadvantage that the cold resistance and heat resistance become poor.

Furthermore, it is reported that a composition obtained by blending a specific cross-linking agent and a specific amine compound in a carboxyl group containing acrylic rubber including a specific structure unit derived from methacrylonitrile does not adhere to metal surfaces and does not cause scorch at the time of processing and that an obtained cross-linked product has excellent heat resistance, cold resistance and degraded oil resistance (the patent article 3). However, the composition does not have enough cold resistance and fuel oil resistance.

The patent article 1: The Japanese Unexamined Patent Publication No. H11-92614

The patent article 2: The Japanese Unexamined Patent Publication No. 2001-146540

The patent article 3: The Japanese Unexamined Patent Publication No. 2003-342437

DISCLOSURE OF THE INVENTION

An object of the present invention is to provide a cross-linkable acrylic rubber composition, by which a cross-linked product to be obtained has well balanced heat resistance, cold resistance and fuel oil resistance and, furthermore, excellent scorch stability.

The present inventors have been committed themselves to study for attaining the above objects, found that new acrylic rubber including an alkoxyalkyl(meth)acrylate unit and methacrylonitrile unit in specific amounts and obtained by being copolymerized with a specific amount of butenedionic acid monoalkyl ester as a cross-linkable monomer did not cause scorch at the time of processing performed by blending a cross-linking agent, and a cross-linked product to be obtained exhibited excellent heat resistance, cold resistance and fuel oil resistance; and completed the present invention based on the knowledge.

According to the present invention, inventions 1 to 6 below are provided.

1. An acrylic rubber, comprising an alkoxyalkyl(meth)acrylate monomer unit in an amount of 70.1 to 99.8 wt %, a methacrylonitrile monomer unit in an amount of 0.1 to 9.9 wt % and a butenedionic acid monoester monomer unit in an amount of 0.1 to 20 wt %.
2. The acrylic rubber as set forth in claim 1, wherein the butenedionic acid monoester monomer unit is a butenedionic acid monoester monomer unit having an alicyclic structure.
3. The acrylic rubber as set forth in claim 2, wherein the butenedionic acid monoester monomer unit having an alicyclic structure is a butenedionic acid monocycloalkylester monomer unit.
4. The acrylic rubber as set forth in any one of claims 1 to 3, wherein the alkoxyalkyl(meth)acrylate monomer unit is a methoxyethyl acrylate monomer unit and/or ethoxyethyl acrylate monomer unit.
5. A cross-linkable acrylic rubber composition made by containing the acrylic rubber as set forth in any one of claims 1 to 4 and a cross-linking agent.
6. A cross-linked product made by cross-linking the cross-linkable acrylic rubber composition as set forth in claim 5.

Note that, in the present invention, the alkoxyalkyl(meth)acrylate monomer unit means an alkoxyalkyl acrylate monomer unit or an alkoxyalkyl methacrylate monomer unit.

According to the present invention, an acrylic rubber composition having excellent scorch stability at the time of processing performed by blending with a cross-linking agent is provided. Furthermore, by cross-linking the acrylic rubber composition, a cross-linked product having excellent heat resistance, cold resistance and fuel oil resistance is provided. Accordingly, by taking advantages of the characteristics, it can be preferably used in a wide range as a material of rubber parts, such as seals, hoses, vibration absorbers, tubes, belts and boots.

BEST MODE FOR CARRYING OUT THE INVENTION

Acrylic Rubber

Acrylic rubber of the present invention is formed by comprising an alkoxyalkyl acrylate monomer unit or a alkoxyalkyl methacrylate monomer unit, referred to as arkoxyalkyl (meth)acrylate monomer below, in an amount of 70.1 to 99.8 wt %, a methacrylonitrile monomer unit in an amount of 0.1 to 9.9 wt %, and a butenedionic acid monoester monomer unit in an amount of 0.1 to 20 wt %.

As an arkoxyalkyl(meth)acrylate monomer, an ester compound of C2 to C8 alkoxyalkyl alcohol and (meth)acrylate is preferable.

Specifically, methoxymethyl(meth)acrylate, ethoxymethyl(meth)acrylate, 2-ethoxyethyl(meth)acrylate, 2-butoxyethyl(meth)acrylate, 2-methoxyethyl (meth)acrylate, 2-propoxyethyl(meth)acrylate, 3-methoxypropyl(meth) acrylate, 4-methoxybutyl (meth)acrylate, etc. may be mentioned.

Among these, 2-ethoxyethyl(meth)acrylate and 2-methoxyethyl (meth)acrylate are preferable.

A content of the alkoxyalkyl(meth)acrylate monomer unit in the acrylic rubber of the present invention is preferably 80 to 95 wt %, and more preferably 85 to 95 wt %. When the content of the alkoxyalkyl(meth)acrylate monomer unit in the acrylic rubber is too small, cold resistance and fuel oil resistance of a cross-linked product may decline in some cases.

A content of the methacrylonitrile monomer unit in the acrylic rubber of the present invention is preferably 1 to 9 wt %, and more preferably 2 to 6 wt %. When the content of the methacrylonitrile monomer unit in the acrylic rubber is too large, heat resistance and cold resistance of the cross-linked product may decline in some cases. On the other hand, when the content is too small, fuel oil resistance of the cross-linked product may decline.

The butenedionic acid monoester monomer is a compound having a monoester structure obtained by bringing butenedionic acid, that is, one carboxyl group of fumaric acid or maleic acid, react with alcohol. The butenedionic acid monoester monomer functions as a cross-linkable monomer.

In the present invention, the butenedionic acid monoester monomer is preferably a butenedionic acid monoester monomer having an alicyclic structure. The alicyclic structure is C3 to C20, preferably C4 to C10, and may be saturated or unsaturated, and may be monocyclic or polycyclic. Specifically, a monocycloalkane structure, monocycloalkene structure, norbornane cyclic structure, and norbornene cyclic structure, etc. may be mentioned, and these may be combined.

To obtain a butenedionic acid monoester monomer having an alicyclic structure, it is preferable to use alcohol having an alicyclic structure as alcohol for reacting with a carboxyl group of butenedionic acid. As the alcohol having an alicyclic structure, any of cycloalkyl alcohol, cycloalkenyl alcohol and alcohols having the alicyclic structure in a part of the main chain and in the side chain may be used. Among them, in the present invention, cycloalkyl alcohol and cycloalkenyl alcohol are preferable, and cycloalkyl alcohol is more preferable. Namely, as a butenedionic acid monoester monomer unit, a butenedionic acid monocycloalkyl ester monomer unit is the most preferable.

As a specific example of a butenedionic acid monoester monomer having an alicyclic structure, monocyclopentyl fumarate, monocyclohexyl fumarate, monocycloheptyl fumarate, monocyclooctyl fumarate, monomethylcyclohexyl fumarate, mono-3,5-dimethylcyclohexyl fumarate, dicyclopentanyl fumarate, isobonyl fumarate, and other fumaric acid monocycloalkyl ester monomers; monocyclopentenyl fumarate, monocyclohexenyl fumarate, monocycloheptenyl fumarate, monocyclooctenyl fumarate, monodicyclopentadienyl fumarate and other fumaric acid monocycloalkenyl ester monomers; monocyclopentyl maleate, monocyclohexyl maleate, monocycloheptyl maleate, monocyclooctyl maleate, monomethylcyclohexyl maleate, mono-3,5-dimethylcyclohexyl maleate, monodicyclopentanyl maleate, monoisobonyl maleate and other maleic acid monocycloalkyl ester monomers; monocyclopentenyl maleate, monocyclohexenyl maleate, monocycloheptenyl maleate, monocyclooctenyl maleate, dicyclopentadienyl maleate and other maleic acid monocycloalkenyl ester monomers; etc. may be mentioned.

Among them, monocyclohexyl fumarate and monocyclohexyl maleate are preferable.

A content of the butenedionic acid monoester monomer unit in the acrylic rubber of the present invention is preferably 0.5 to 10 wt %, and more preferably 1 to 5 wt %. When a quantity of the butenedionic acid monoester monomer unit is too small, cross-linking density of the cross-linked product becomes insufficient and preferable mechanical characteristics cannot be obtained. While, when it is conversely too large, elongation of the cross-linked product may decline and the permanent compression set may increase in some cases.

In the acrylic rubber of the present invention, a content of a carboxyl group is preferably $5\times10^{-4}$ to $4\times10^{-1}$ equivalent weight, more preferably $2\times10^{-3}$ to $2\times10^{-1}$ equivalent weight, and particularly preferably $4\times10^{-3}$ to $1\times10^{-1}$ equivalent weight with respect to 100 grams of the rubber. When the carboxyl group content in the acrylic rubber is too small, cross-linking does not proceed sufficiently and a shape of the cross-linked product may not be held. Conversely, when the content is too large, the cross-linked product becomes hard and rubber elasticity may be lost in some cases.

The acrylic rubber of the present invention can be obtained by performing radical polymerization on the above alkoxyalkyl(meth)acrylate monomer, methacrylonitrile monomer and butenedionic acid monoester monomer with, in accordance with need, a monomer mixture including a monomer capable of being copolymerized with these monomers to be used. As a form of the polymerization reaction, any of the emulsion polymerization method, suspension polymerization method, bulk polymerization method and solution polymerization method may be used, but the emulsion polymerization under a normal pressure generally used as a production method of well-known acrylic rubbers is preferable in terms of easiness of controlling the polymerization reaction, etc.

A normal method may be used when polymerizing by the emulsion polymerization method, and generally used well-known ones may be used as a polymerization initiator, polymerization terminator, emulsifier, etc.

The Mooney viscosity ($ML_{1+4}$, 100° C.) of the acrylic rubber of the present invention is preferably 10 to 80, more preferably 20 to 70, and particularly preferably 30 to 70. If the Mooney viscosity is too small, the cross-linked product is liable to drop in shapeability and mechanical strength, while when too large, the shapeability may deteriorate.

The acrylic rubber of the present invention is mixed with a cross-linking agent to obtain a cross-linkable acrylic rubber composition, and the cross-linkable acrylic rubber composition is made to be a cross-linked product by cross-linking reaction and used for a variety of rubber parts.

Cross-Linkable Acrylic Rubber Composition

The cross-linkable acrylic rubber composition of the present invention is formed by including the above acrylic rubber and a cross-linking agent explained below.

A cross-linking agent to be used for the cross-linkable acrylic rubber of the present invention may be any as far as it is a generally used compound as a cross-linking agent of acrylic rubbers, but amine compounds are preferable and polyvalent amine compounds are the most preferable for the capability of forming a cross-linking structure with a carboxyl group, etc. of butenedionic acid monoester monomer unit relatively easily.

As such an amine compound, specifically, an aliphatic polyvalent amine cross-linking agent and aromatic polyvalent amine cross-linking agent, etc. may be mentioned. Note that those having nonconjugated nitrogen-carbon double bond like guanidine compounds are not included.

As the aliphatic polyvalent amine cross-linking agent, hexamethylene diamine, hexamethylene diaminecarbamate, N,N'-dicinnamilidene-1,6-hexane diamine etc. may be mentioned.

As the aromatic polyvalent amine cross-linking agent, 4,4'-methylene dianiline, m-phenylene diamine, 4,4'-diaminodiphenyl ether, 3,4'-diaminodiphenyl ether, 4,4'-(m-phenylene diisopropylidene)dianiline, 4,4'-(p-phenylene diisopropylidene)dianiline, 2,2'-bis[4-(4-aminophenoxy)phenyl]propane, 4,4'-diaminobenzanilide, 4,4'-bis(4-aminophenoxy)biphenyl, m-xylylene diamine, p-xylylene diamine, 1,3,5-benzene triamine, and 1,3,5-benzene triaminomethyl, etc. may be mentioned.

The amount blended of the cross-linking agent in the cross-linkable acrylic rubber composition is preferably 0.05 to 20 parts by weight, more preferably 0.1 to 10 parts by weight, furthermore preferably 0.2 to 7 parts by weight, and particularly preferably 0.3 to 5 parts by weight with respect to 100 parts by weight of the acrylic rubber. When the amount blended of the cross-linking agent is too small, cross-linking becomes insufficient and shape of the cross-linked product is hard to be held. On the other hand, when the content is too large, the cross-linked product becomes too hard and elasticity as cross-linked rubber, etc. may be lost.

In the cross-linkable acrylic rubber composition of the present invention, a cross-linking accelerator may be furthermore blended to be combined with the cross-linking agent for use.

The cross-linking accelerator is not limited, either, but a cross-linking accelerator able to be used in combination with the above polyvalent amine cross-linking agents is preferable and, specifically, those having base dissociation constant of $10^{-12}$ to $10^6$ at 25° C. in water are preferable. As such a cross-linking accelerator, for example, guanidine compounds, imidazole compounds, quaternary onium salt, tertiary phosphine compounds, alkali metal salt of a weak acid, etc. may be mentioned.

As the guanidine compounds, 1,3-diphenylguanidine, 1,3-di-o-tolylguanidine, etc. may be mentioned.

As the imidazole compounds, 2-methylimidazole, 2-phenylimidazole, etc. may be mentioned.

As the quaternary onium salt, tetra n-butyl ammonium bromide, octadecyl tri n-butyl ammonium bromide, etc. may be mentioned.

As the polyvalent tertiary amine compounds, triethylene diamine, 1,8-diazabicyclc[5.4.0]undecene-7, etc. may be mentioned.

As the tertiary phosphine compounds, triphenyl phosphine, tri-p-tolyl phosphine, etc. may be mentioned.

As the alkali metal salt of a weak acid, phosphoric acid of sodium or potassium, carbonic acid, or other inorganic weak acid salt and stearic acid salt, lauric acid salt, or other organic weak acid salt may be mentioned.

A use amount of the cross-linking accelerator in the cross-linkable acrylic rubber composition is preferably 0.1 to 20 parts by weight, more preferably 0.2 to 15 parts by weight, and particularly preferably 0.3 to 10 parts by weight with respect to 100 parts by weight of the acrylic rubber. When the cross-linking accelerator is too much, it is liable that a cross-linking speed becomes too fast, bloom of the cross-linking accelerator arises on the cross-linked product surface, and the cross-linked product becomes too hard in some cases. When the cross-linking accelerator is too small, it is liable that tensile strength of the cross-linked product remarkably declines and elongation change or tensile strength change after thermal loading may become too big in some cases.

Preferably, the cross-linkable rubber composition of the present invention furthermore contains a monoamine compound. By particularly blending a monoamine compound, the composition becomes hard to adhere to metals and the workability improves in roll processing and Banbury processing before cross-linking.

As a monoamine compound as such, aromatic monoamine compounds and aliphatic monoamine compounds may be mentioned. These may be any of primary amine compounds, secondary amine compounds and tertiary amine compounds. In the present invention, these monoamine compounds may be used alone or in combination of two or more kinds. When using alone, mono primary amine compounds are preferable. When using in combination of two or more kinds, it is preferable to combine aliphatic mono secondary amine compounds and aliphatic mono tertiary amine compounds for use.

The amount blended of the monoamine compounds with respect to 100 parts by weight of the acrylic rubber is 0.05 to 20 parts by weight and preferably 0.1 to 10 parts by weight in total. Particularly when using a mono primary amine alone, 0.1 to 10 parts by weight is preferable and 0.2 to 5 parts by weight is more preferable. When combining aliphatic mono secondary amines and aliphatic mono tertiary amines for use, the total amount is preferably 0.2 to 10 parts by weight and more preferably 0.5 to 7 parts by weight. When the amount blended of the monoamine compounds is too small, adherence of the acrylic rubber composition to metals increases and the workability is deteriorated. Conversely, when the amount blended is too large, it is liable that the monoamine compounds cause bloom on the cross-linked product surface, strength of the cross-linked product remarkably declines, and permanent compression set becomes large in some cases.

The cross-linkable acrylic rubber composition of the present invention may also contain, in accordance with need, a reinforcing agent, filler, antioxidant, light stabilizer, plasticizer, lubricant, adhesive, lubricating agent, flame retardant, anti-mold agent, antistatic agent, coloring agent, or other additives.

Also, the acrylic rubber composition may be furthermore blended with other rubber than the acrylic rubber of the present invention, such as elastomer and resins, etc. in accordance with need.

As rubber able to be blended, for example, natural rubbers, acrylic rubbers having different compositions from that of the acrylic rubber of the present invention, polybutadiene rubbers, polyisoprene rubbers, styrene-butadiene rubbers and acrylonitrile-butadiene rubbers, etc. may be mentioned.

As elastomer able to be blended, for example, olefin based elastomer, styrene based elastomer, polyvinyl chloride based elastomer, polyester based elastomer, polyamide based elastomer, polyurethane based elastomer, and polysiloxane based elastomer, etc. may be mentioned.

As resins able to be blended, for example, polyolefin based resins, polystyrene based resins, polyacrylic based resins, polyphenirene ether based resins, polyester based resins, polycarbonate based resins, and polyamide resins, etc. may be mentioned.

When fabricating the cross-linkable acrylic rubber composition of the present invention, a suitable mixing method may be used, such as roll mixing, Bunbary mixing, screw mixing and solution mixing. The blending order is not particularly limited, and it is sufficient if compounds hard to be brought to react or decompose are mixed sufficiently and, then, components easily brought to react by heat or components easily brought to decompose, such as a cross-linking agent, are mixed at a temperature of not causing any reaction or decomposition in a short time.

A molding method of the cross-linkable acrylic rubber composition is not particularly limited. Any of the compression molding, injection molding, transfer molding and extrusion molding, etc. may be used. Also, the cross-linking method may be selected in accordance with a shape, etc. of the cross-linked product, and either of a method of performing molding and cross-linking at a time and a method of performing cross-linking after molding may be used.

The cross-linkable acrylic rubber composition of the present invention can be made to be a cross-linked product by heating. The heating temperature is preferably 130 to 220° C., and more preferably 140 to 200° C., and the cross-linking time is preferably 30 seconds to 5 hours. The heating method may be suitably selected from methods to be used for cross-linking rubbers, such as the press heating, steam heating, oven heating and hot air heating, etc. Alternately, post-cross-linking may be performed after performing cross-linking once, so that inside of the cross-linked product is surely cross-linked. The post-cross-linking is preferably performed for 1 to 48 hours depending on the heating method, cross-linking temperature and shape, etc. The heating method and heating temperature at the time of performing the post-cross-linking may be suitably selected.

The cross-linkable acrylic rubber composition of the present invention has excellent scorch stability at the time of processing, excellent heat resistance and permanent compression set characteristics after cross-linking. Accordingly, the cross-linked product obtained by cross-linking the acrylic rubber composition can be preferably used widely as a material of rubber parts, such as seals, hoses, vibration absorbers, tubes, belts and boots, by taking advantage of these characteristics.

EXAMPLES

Below, the present invention will be more specifically explained by taking examples and comparative examples. In the examples, "parts" and "%" are based on weight unless otherwise indicated. Note that the present invention is not limited only to these examples. Furthermore, an acrylic rubber, a cross-linkable acrylic rubber composition and the cross-linked product were evaluated by the methods below.

Mooney Viscosity

Mooney viscosity $ML_{1+4}$ of acrylic rubber was measured at a measurement temperature of 100° C. based on the Mooney viscosity test of the uncrosslinked rubber physical testing method of JIS K6300.

Scorch Stability

Mooney scorch time (t5) of the cross-linkable acrylic rubber composition was measured at 125° C. based on JIS K6300. The larger the value of the Mooney scorch time (t5) is, the more excellent the scorch stability is.

Cold Resistance ($T_{10}$ in Gehman Torsion Test)

First, the cross-linkable acrylic rubber composition was heated at 170° C. for 20 minutes and formed to be a sheet having a thickness of 2 mm by press molding. The sheet sample was left still at 170° C. for 4 hours, secondary cross-linking was performed thereon and, then, the result was punched out to a rectangular shape of 40 mm×30 mm to obtain a test piece. The obtained test piece was used to measure a temperature (Gehman $T_{10}$), at which the specific modulus "RM" becomes 10, based on the low temperature torsion test of JIS K6261.

Fuel Oil Resistance (Volume Change Rate in Fuel Oil Immersion Test)

A sheet was produced in the same way as the test piece for the Gehman test, secondary cross-linking was performed and, then, the result was punched to a rectangular shape of 50 mm×20 mm to obtain a test piece. The obtained test piece was immersed in testing fuel oil (2,2,4-trimethylpentan/toluene=40/60) at 40° C. for 70 hours and the volume change rate was measured based on JIS K6258.

Heat Resistance (Cross-linked Product Property Change Amount after Heat Loading)

The cross-linkable acrylic rubber composition was molded by pressing at 170° C. for 20 minutes, subjected to cross-linking, formed to be a size of 15 cm×15 cm×2 mm, left still at 170° C. for 4 hours for post-cross-linking to obtain a sheet. The result was punched to a predetermined shape to produce a test piece. The obtained test piece was used for the measurements below.

First, hardness was measured based on the hardness test of JIS K6253 as a normal state property. Next, based on JIS K6257, thermal aging in the air was performed under an environment of 175° C. for 336 hours, and the hardness was measured again. From the results, a hardness change amount (point) before and after the thermal aging was obtained. The closer the change amount is to "0", the more excellent the heat resistance is.

Example 1

A polymerization reactor equipped with a thermometer, stirring device, nitrogen introduction tube and decompressing device was prepared with water in an amount of 200 parts, sodium lauryl sulfate in an amount of 3 parts, methoxyethyl acrylate in an amount of 93 parts, methacrylonitrile in an amount of 5 parts and monocyclohexyl fumarate in an amount of 2 parts. Then, evacuated by reducing the pressure and replaced with nitrogen repeatedly to sufficiently remove the oxygen, then added with sodium formaldehydesulfoxylate in an amount of 0.02 part and cumene hydroperoxide in an amount of 0.005 part, brought to start emulsion polymerization reaction at a normal temperature, the reaction was continued until the polymerization conversion rate reaches 95%. Thus obtained emulsion polymerization liquid was solidified by a calcium chloride solution, washed with water and dried to obtain acrylic rubber A.

The acrylic rubber A (a methoxyethyl acrylate unit content in 93%, a methacrylonitrile unit content in 5%, monocyclohexyl fumarate unit content in 2%, Mooney viscosity of 47.5 ($ML_{1+4}$, 100° C.)) in an amount of 100 parts, carbon black (N550 when classified based on ASTM D1765) in an amount of 60 parts, stearic acid (a dispersant and softener of carbon black) in an amount of 2 parts and 4,4'-bis(α,α-dimethylbenzyl)diphenylamine (antioxidant) in an amount of 2 parts were kneaded at 50° C. by Bunbary, then added with hexamethylene diaminecarbamate (an aliphatic diamine cross-linking agent) in an amount of 0.5 part and di-o-tolylguanidine (cross-linking accelerator) in an amount of 2 parts and kneaded by an open roll at 40° C. to fabricate a cross-linkable acrylic rubber composition.

Example 2

The same procedure was followed as in the production of acrylic rubber A as the Example 1 except for using methoxyethyl acrylate in an amount of 53 parts, ethoxyethyl acrylate in an amount of 40 parts, methacrylonitrile in an amount of 5 parts and monocyclohexyl fumarate in an amount of 2 parts, and acrylic rubber B was obtained. A cross-linkable acrylic rubber composition was fabricated in the same way as in the Example 1 except for using the acrylic rubber B.

Example 3

The same procedure was followed as in the production of acrylic rubber A as the Example 1 except for using methoxyethyl acrylate in an amount of 95 parts, methacrylonitrile in an amount of 3 parts and monocyclohexyl fumarate in an amount of 2 parts, and acrylic rubber C was obtained. A cross-linkable acrylic rubber composition was fabricated in the same way as in the Example 1 except for using the acrylic rubber C.

Example 4

The same procedure was followed as in the production of acrylic rubber A as the Example 1 except for using methoxyethyl acrylate in an amount of 95 parts, methacrylonitrile in an amount of 3 parts and mono n-butyl fumarate in an amount of 2 parts, and acrylic rubber D was obtained. A cross-linkable acrylic rubber composition was fabricated in the same way as in the Example 1 except for using the acrylic rubber D.

By using these cross-linkable acrylic rubber compositions (Examples 1 to 4), the Mooney scorch time was measured by the method explained above. Furthermore, by using test pieces produced by pressing and performing cross-linking and post-cross-linking on the cross-linkable acrylic rubber compositions under the condition explained above, cold resistance, fuel oil resistance and heat resistance of the cross-linked products were evaluated. The results are shown in Table 1.

Comparative Example 1

The same procedure was followed as in the production of acrylic rubber A as the Example 1 except for using methoxyethyl acrylate in an amount of 98 parts and monocyclohexyl fumarate in an amount of 2 parts and not using methacrylonitrile, and acrylic rubber E was obtained.

Comparative Example 2

The same procedure was followed as in the production of acrylic rubber A as the Example 1 except for using methoxyethyl acrylate in an amount of 93 parts, monocyclohexyl fumarate in an amount of 2 parts and acrylonitrile in an amount of 5 parts instead of methacrylonitrile, and acrylic rubber F was obtained.

Comparative Example 3

The same procedure was followed as in the production of acrylic rubber A as the Example 1 except for using methoxyethyl acrylate in an amount of 83 parts, acrylonitrile in an amount of 15 parts and monocyclohexyl fumarate in an amount of 2 parts, and acrylic rubber G was obtained.

Comparative Example 4

The same procedure was followed as in the production of acrylic rubber A as the Example 1 except for using methoxyethyl acrylate in an amount of 63 parts, ethyl acrylate in an amount of 30 parts, methacrylonitrile in an amount of 5 parts and monocyclohexyl fumarate in an amount of 2 parts, and acrylic rubber H was obtained.

By using the acrylic rubbers E to H (the Comparative Examples 1 to 4) obtained by the reactions explained above, cross-linkable acrylic rubber compositions and the cross-linked products were fabricated in the same way as in the Example 1, and respective properties were evaluated in the same way as in the Examples 1 to 4. The results are shown in Table 1.

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Content of Acrylic Rubber Composing Unit (wt %) | | | | | | | | |
| Methoxyethyl Acrylate | 93 | 53 | 95 | 95 | 98 | 93 | 83 | 63 |
| Ethoxyethyl Acrylate | — | 40 | — | — | — | — | — | — |
| Ethyl Acrylate | — | — | — | — | — | — | — | 30 |
| Methacrylonitrile | 5 | 5 | 3 | 3 | — | — | 15 | 5 |
| Acrylonitrile | — | — | — | — | — | 5 | — | — |
| Monocyclohexyl Fumarate | 2 | 2 | 2 | — | 2 | 2 | 2 | 2 |
| Mono n-butyl Fumarate | — | — | — | 2 | — | — | — | — |
| Acrylic Rubber Mooney Viscosity (ML1 + 4, 100° C.) | 47.5 | 45.3 | 44.1 | 44.3 | 38.4 | 43.2 | 43.7 | 44.7 |
| Scorch Stability | | | | | | | | |
| Mooney Scorch (t5) (min) | 3.9 | 3.8 | 3.5 | 2.0 | 2.4 | 3.5 | 3.7 | 4.6 |

TABLE 1-continued

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Cold Resistance |  |  |  |  |  |  |  |  |
| $T_{10}$ in Gehman Torsion Test (° C.) | −25 | −28 | −29 | −29 | −32 | −27 | −20 | −18.0 |
| Fuel Oil Resistance |  |  |  |  |  |  |  |  |
| Volume Change Rate (%) | 20 | 30 | 30 | 30 | 35 | 27.7 | 24.2 | 50 |
| Property Change Amount of Cross-linked Product After Thermal Loading |  |  |  |  |  |  |  |  |
| Hardness Change (Point) | 20 | 25 | 29 | 29 | 35 | 46 | 30 | 28 |

As is clear from Table 1, the acrylic rubber not containing a methacrylonitrile unit (the Comparative Example 1) exhibits poor fuel oil resistance when made to a cross-linkable acrylic rubber composition.

Also, when changing a methacrylonitrile unit to a acrylonitrile unit (the Comparative Example 2), the heat resistance becomes poor.

Also, the acrylic rubber containing a methacrylonitrile unit in an amount of exceeding 10 parts regulated in the present invention (the Comparative Example 3) has remarkably declined cold resistance when made to a cross-linkable acrylic rubber composition.

Furthermore, when alkoxyalkyl acrylate is in short of the regulated amount of the present invention (the Comparative Example 4), the cold resistance and fuel oil resistance are poorly balanced.

On the other hand, the acrylic rubber and acrylic rubber composition of the present invention have excellent scorch stability, and cold resistance, heat resistance and fuel oil resistance of the cross-linked product are well balanced (Examples 1 to 4).

The invention claimed is:

1. An acrylic rubber, comprising an alkoxyalkyl(meth)acrylate monomer unit in an amount of 70.1 to 99.8 wt %, a methacrylonitrile monomer unit in an amount of 0.1 to 9.9 wt % and a butenedionic acid monoester monomer unit in an amount of 0.1 to 20 wt %.

2. The acrylic rubber as set forth in claim 1, wherein said butenedionic acid monoester monomer unit is a butenedionic acid monoester monomer unit having an alicyclic structure.

3. The acrylic rubber as set forth in claim 2, wherein said butenedionic acid monoester monomer unit having an alicyclic structure is a butenedionic acid monocycloalkylester monomer unit.

4. The acrylic rubber as set forth in any one of claims 1 to 3, wherein said alkoxyalkyl(meth)acrylate monomer unit is a methoxyethyl acrylate monomer unit and/or ethoxyethyl acrylate monomer unit.

5. A cross-linkable acrylic rubber composition made by containing the acrylic rubber as set forth in any one of claims 1 to 3 and a cross-linking agent.

6. A cross-linked product made by cross-linking the cross-linkable acrylic rubber composition as set forth in claim 5.

* * * * *